United States Patent [19]

Sjögren et al.

[11] Patent Number: 4,596,983
[45] Date of Patent: Jun. 24, 1986

[54] MODULE FOR PRINTED ASSEMBLIES IN A TELECOMMUNICATION SYSTEM AN APPARATUS FOR AUTOMATICALLY PUTTING THE MEANS ON PRINTED BOARD ASSEMBLIES NEWLY INSERTED INTO THE MODULE INTO OPERATION

[76] Inventors: Stig W. L. Sjögren, Plåtslagarv 24, S-146 00 Tullinge, Sweden; Per-Martin Hedström, 2020 W. Alameida Ave. 15 H, Anaheim, Calif. 92801

[21] Appl. No.: 471,012

[22] Filed: Mar. 1, 1983

[30] Foreign Application Priority Data

Mar. 2, 1982 [SE] Sweden ................................ 8201266

[51] Int. Cl.$^4$ ............................................. H04Q 9/00
[52] U.S. Cl. ............................. 340/825.52; 340/825.08
[58] Field of Search ....................... 340/825.52, 825.49, 340/501, 825.22, 825.08; 361/409

[56] References Cited

U.S. PATENT DOCUMENTS

| 4,200,865 | 4/1980 | Morioka et al. | 340/501 |
| 4,399,330 | 8/1983 | Kuenzel | 340/825.49 |
| 4,456,790 | 6/1984 | Soyack | 340/825.08 |

Primary Examiner—Donald J. Yusko

[57] ABSTRACT

The invention relates to an apparatus for, in a printed board assembly module (1), which has room for a predetermined number of printed board assemblies having different types of controlled auxiliary means serving traffic-carrying means in a telecommunication system, automatically putting the auxiliary means on a printed board assembly newly inserted into an arbitrary place (KKP1-KKPn) within the module (1) into operation. Each printed board assembly is provided with a single type of auxiliary means, and the telecommunication system comprises a number of control logic units (SLU-1-SLUm) corresponding to the number of different types of auxiliary means, for controlling the respective type of auxiliary means. In accordance with the invention, each printed board assembly is provided with an identifying unit for identifying the control logic unit which is to control the type of auxiliary means on the board in question. There is furthermore provided a scanning device (2) adapted for continuously scanning the board places (KKP1-KKPn) and on discovering a newly inserted printed board assembly for transferring information about its geographic position in the module (1) to the control logic unit identified by the identifying unit on the board, subsequent to which said control logic unit handles the control of the auxiliary means on the newly inserted board.

2 Claims, 1 Drawing Figure

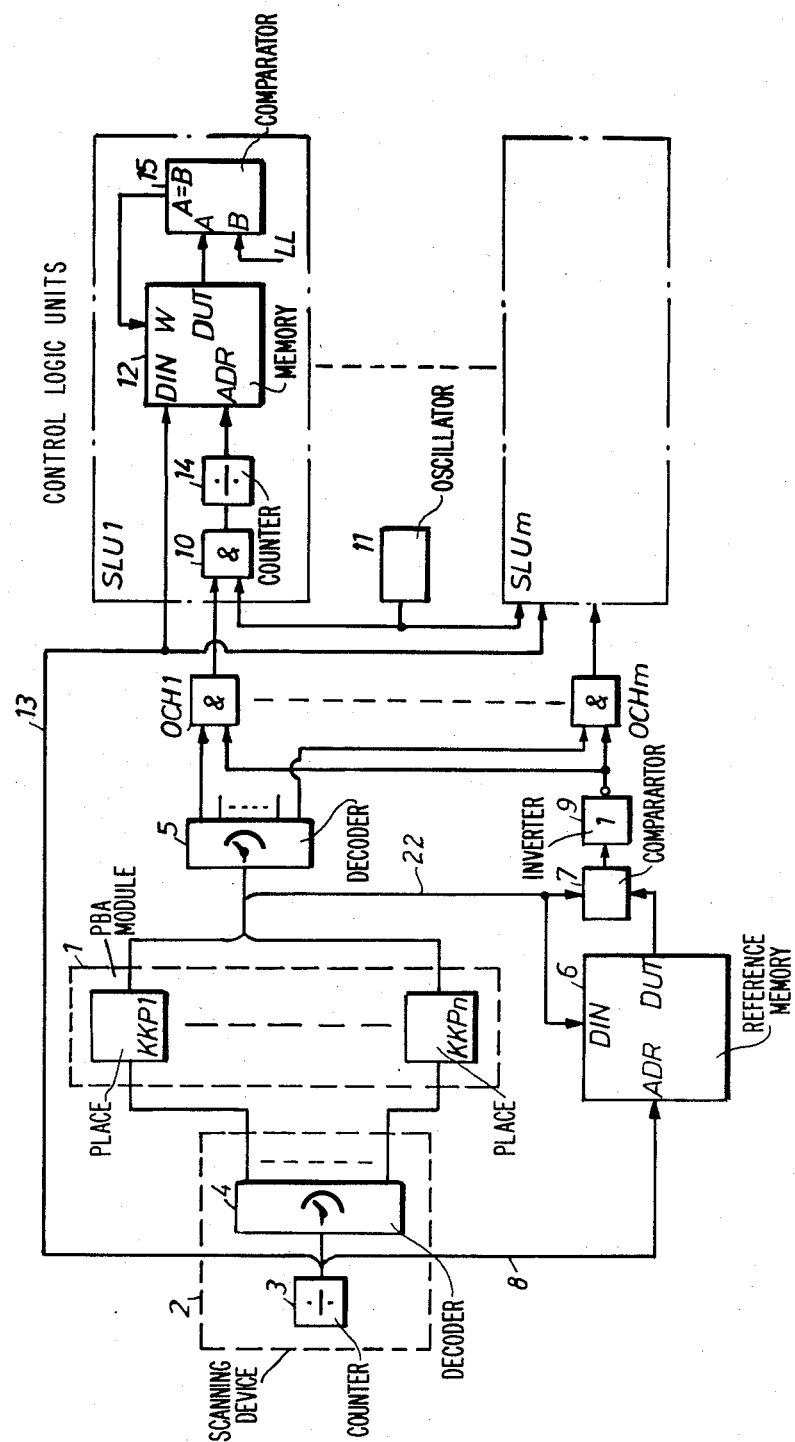

MODULE FOR PRINTED ASSEMBLIES IN A TELECOMMUNICATION SYSTEM AN APPARATUS FOR AUTOMATICALLY PUTTING THE MEANS ON PRINTED BOARD ASSEMBLIES NEWLY INSERTED INTO THE MODULE INTO OPERATION

TECHNICAL FIELD

The present invention relates to an apparatus for, in a printed board assembly module, which has room for a predetermined number of printed board assemblies (PBAs) having different types of controlled auxiliary means serving traffic-carrying means in a telecommunication system, automatically putting the auxiliary means on a printed board assembly newly inserted into an arbitrary place within the module into operation, each PBA being provided with a single type of auxiliary means and the telecommunication system having a number of control logic units corresponding to the number of different types of auxiliary means for controlling the respective type of auxiliary means.

BACKGROUND ART

When a PBA is inserted into a PBA module, it has up to now been necessary either to put the right board in the right place, i.e. each place is unique to a specific board, or to put a board in an arbitrary place and thereafter manually, e.g. by some form of programming, inform the system of what type of board that has been inserted and in what place this board has been inserted. Both of these methods require great care by the operator.

DISCLOSURE OF INVENTION

An object of the present invention is to provide an apparatus that makes it possible in a PBA module to automatically put the means on an optional type of PBA newly inserted into an arbitrary place in a PBA module into operation.

This is achieved by the apparatus having been given the characterizing features set forth in the claims.

DESCRIPTION OF FIGURE

The invention will now be described in detail below with reference to the accompanying drawing, on which the sole FIGURE illustrates an embodiment of the apparatus in accordance with the invention.

PREFERRED EMBODIMENT

In the FIGURE, the numeral 1 denotes a PBA module with n board places KKP1-KKPn for PBAs provided with different types of controlled auxiliary means, e.g. tone transmitters/receivers, code transmitters/receivers etc., serving traffic-carrying means in a telecommunication system, none of which is illustrated. Each PBA is provided with one or more auxiliary means of one and the same type, and for controlling these means there is a number of control logic units SLU1-SLUm corresponding to the number of different types of auxiliary means.

As mentioned in the intruduction, an object of the invention is to make it possible to automatically put into operation the auxiliary means on an arbitrary PBA inserted into an arbitrary board place KKP1-KKPn in the PBA module 1.

In the illustrated embodiment this is accomplished by means of a scanning device 2, having a counter 3 for continuously counting the geographic address of the different board places, each counter value representing a unique place KRP, and a decoder 4 connected to the output of the counter 3, for indicating the board places in the module 1 in turn (The count values or board place addresses also being fed to lines 8 and 13.). In accordance with the invention each PBA is provided with an identifying unit, e.g. a microcomputer, which is adapted, when polled by decoder 4, to supply information or a code value as to which of the different control logic units SLU1-SLUm is to control the type of auxiliary means on the board in question. This information (code value) is fed (a) to a decoder 5 for indicating the appropriate control unit, (b) to the data input DIN of a reference memory 6. Memory 6 has a plurality of addressed registers, each containing information as to whether the PBA places KKP1-KKPn are equipped or not, and (c) to one input of a comparator 7, adapted for comparing information (code value) from the PBA module 1 respecting the equipment of the board place then being polled by scanning device 2 with the information coming from the data output DUT of the reference memory 6 in response to the count value on line 8 fed to address input ADR, concerning the up-to-the-moment state of the PBA place in question. When an address is supplied to input ADR of memory 6 it first reads out the contents of the addressed register into output DOT and then replaces such contents with the information at input DTN. An inverter 9 is connected to the output of the comparator 7, the output of the inverter in turn being connected to one input of a number of AND gates OCH1-OCHm corresponding to the number of control logic units SLU1-SLUm, each AND gate having two inputs, the other input of the respective AND gates being each connected to its respective output from the decoder 5.

If the information (code value) on line 22 concerning the equipment of the PBA place in question agrees with the information stored in the reference memory 6 concerning the same PBA place, the comparator 7 supplies a signal to the inverter 9, which signal however does not give rise to any signal on the output of the ivnerter 9. On the other hand, if a board has newly been inserted into an arbitrary PBA place which was previously unoccupied in the module 1, this is discovered at the comparison in the comparator 7, which in turn gives rise to a signal at the output of the inverter 9. (In addition the data on line 22 is read into the selected register of memory 6). The decoder 5 decodes the identity information (code value) concerning the auxiliary means on the PBA newly inserted into the module 1, and indicates the control logic unit, e.g. the unit SLU1; which is intended to handle the control of the means on the newly inserted board. In this case signals will appear at both inputs of the AND gate OCH1, giving rise to an output signal over the output of this AND gate, this signal being applied to one input of an AND gate 10 in the control logic unit SLU1. The other input of the AND gate 10 is connected to the output of an (pulse generator) oscillator 11 common to the control logic units. There is furthermore a memory 12 in the control logic unit SLU1 for storing the geographic addresses to all the boards in the module 1 that are provided with auxiliary means to be controlled by the control logic unit SLU1.

When a newly inserted PBA is now discovered in the module 1, its geographic address is to be stored in the appropriate conrol logic unit, i.e. in this case the control logic unit SLU1. The address to the PBA place where the new PBA has been inserted is available via a line 13 from the counter 3 in the scanning device 2. This address is applied to the data input DIN of the memory 12 in the control logic unit SLU1, as well as to the corresponding input of the corresponding memory in the remaining control logic units. (But at this time decoder 5 is selecting logic unit SLU1.) The geographic address of the newly inserted PBA is to be stored at the first free location in the memory 12 of the control logic unit SLU1. When such unit is activated for reception in that a signal appears at the output of the AND gate OCH1, a process is started within the control logic unit for seeking a free storage location in the memory 12. This is accomplished with the aid of the oscillator 11 and the AND gate 10, the output signal of which steps a counter 14 to sequential addresses in the memory 12 via its address input ADR in order to determine whether the corresponding address location is free or not. This is decided with the aid of a comparator 15, one input A of which is connected to the data output DUT of the memory 12, and the other input 8 of which has a signal LL applied to it, having the significance "free storage location", from a signal souce (not illustrated). Initially all registers of memory 12 store a vaue which is greater than the highest place address generated by counter 3. This value is also the "free storage location" indicator on signal LL. When both these signals concur, i.e. when a free storage location is discovered in the memory 12, the comparator 15 supplies an output signal over its output A=B to the write input W of the memory 12. When this signal appears the geographic address to the board place into which the new board PBA has been inserted, is written into the located, unoccupied storage location in the memory 12.

When the geographic address of the newly inserted PBA has been stored in the conrol logic unit SLU1, the latter can, when needed, indicate the PBA place in question in the module 1 for controlling the auxiliary means on the PBA inserted into this place. The means for this indication of the PBA place from the conrol logic unit are not shown on the drawing.

With the aid of the apparatus described above it will thus be possible to automatically put into operation the auxiliary means on a newly inserted PBA irrespective of into what place the board has been inserted in the module 1.

We claim:

1. In a printed board assembly module (1) which has room for a predetermined number of printed board assemblies, said printed board assemblies supporting different types of controlled auxiliary means which serve traffic carrying means in a telecommunication system, an apparatus for facilitating automatically putting into operation the auxiliary means supported by a printed board assembly newly inserted into an arbitrary place (KKP1-KKPb) within the module (1), each printed board assembly being provided with a single type of auxiliary means, a number of control logic units (SLU1-SLUm) each controlling a definite type of auxiliary means, each printed board assembly having identification means for sending a selected signal to the control logic unit (SLU1-SLUm) controlling the type of auxiliary means supported by the board in question, a scanning device (2) generating counting values each representing the geographical position of a printed board assembly and first control signals supplied sequentially to said idnetification means so as to generate a control logic unit selecting signal, reference memory means (6) recording receiving of said selecting signal at an address corresponding to the respective geographical position and generating a second control signal if such recording has not been carried out before, control means (7, 9, OCHI-OCHm) allowing said selecting signal to pass when said second control signal occurs and means in said control units for recording said counting value (13) when receiving it simultaneously with said selecting signal, for use when addressing printed boards the auxiliary means of which are controlled by the respective control logic unit.

2. In a printed board assembly module which has addressed spaces for a predetermined number of printed board assemblies wherein each assembly carries only one kind of controlled auxiliary means from a set of different controlled auxiliary means and each printed board assembly includes means for generating, in response to a polling signal, a code value unique to the kind of controlled auxiliary means carried by the assembly, apparatus for facilitating the automatic operative incorporation of a printed board assembly in a system after said assembly is inserted into a previously empty addressed space of the module comprising scanning means for sequentially generating the addresses of said addressed spaces, decoding means responsive to said addresses for applying polling signals to each of said addressed spaces so that if a printed board assembly is in the polled addressed space there is emitted therefrom a unique code value, a reference memory means having addressed registers in one-to-one correspondence with the addressed spaces for storing therein code values, a data output, a data input, and control means whereby whenever an address is generated by said scanning means the contents of the addressed register is fed to said data output and at least for the first polling of a printed board assembly after its insertion into the corresponding addressed space the recording into the corresponding addressed register of the code value received at said data output from said printed board assembly, comparator means for comparing a code value generated by an inserted printed board assembly and the contents of the corresponding addressed register for generating a first control signal only if the contents of said addressed register is not the same as the generated code value, further decoder means for generating one of a set of second control signals corresponding to the code value associated with the set of controlled auxiliary means, a set of control logic units corresponding to the set of controlled auxiliary means and including further memory means for storing the space addresses of printed board assemblies carrying the corresponding controlled auxiliary means, and further control means responsive to said first and second control signals for recording in memory means of a selected one of said control logic units the space address then being generated by said scanning means.

* * * * *